United States Patent
Bumgardner et al.

(10) Patent No.: US 9,915,812 B2
(45) Date of Patent: Mar. 13, 2018

(54) COMPACT FOLDING LENS DISPLAY MODULE

(71) Applicant: Kopin Corporation, Westborough, MA (US)

(72) Inventors: Rodney J. Bumgardner, Cupertino, CA (US); Bor-Yeu Tsaur, Lincoln, MA (US)

(73) Assignee: Kopin Corporation, Westborough, MA (US)

( * ) Notice: Subject to any disclaimer, the term of this patent is extended or adjusted under 35 U.S.C. 154(b) by 357 days.

(21) Appl. No.: 14/620,427

(22) Filed: Feb. 12, 2015

(65) Prior Publication Data

US 2015/0234168 A1     Aug. 20, 2015

Related U.S. Application Data

(60) Provisional application No. 61/940,014, filed on Feb. 14, 2014.

(51) Int. Cl.
*G02F 1/1343*     (2006.01)
*G02B 17/08*     (2006.01)
*G02B 25/00*     (2006.01)

(52) U.S. Cl.
CPC ......... *G02B 17/086* (2013.01); *G02B 25/001* (2013.01)

(58) Field of Classification Search
CPC .... G02F 1/1343; G02B 17/086; G02B 25/001
See application file for complete search history.

(56) References Cited

U.S. PATENT DOCUMENTS

| | | | | |
|---|---|---|---|---|
| 5,416,633 | A * | 5/1995 | Michel | G02B 23/10 349/13 |
| 5,812,224 | A * | 9/1998 | Maeda | G02B 27/0176 345/8 |
| 6,573,952 | B1 * | 6/2003 | Yamazaki | G02B 27/017 349/11 |
| 6,618,099 | B1 * | 9/2003 | Spitzer | G02B 27/0172 349/13 |
| 6,847,489 | B1 * | 1/2005 | Wu | G02B 27/017 349/13 |
| 6,963,379 | B2 * | 11/2005 | Tomono | G02B 27/0172 349/11 |
| 8,159,417 | B2 * | 4/2012 | Nakashima | G02B 27/017 345/7 |
| 8,362,974 | B2 * | 1/2013 | Miyake | H04N 5/7491 345/7 |

(Continued)

OTHER PUBLICATIONS

"Capabilities Optics Naviation" by Kopin Corporation dated Jan. 31, 2014.

*Primary Examiner* — Timothy L Rude
(74) *Attorney, Agent, or Firm* — Hamilton, Brook, Smith, & Reynolds, P.C.

(57) ABSTRACT

A compact display module, such as can be used in wearable computing headset applications, includes a microdisplay with a display surface that is virtually imaged by a lens. The lens is positioned to receive light from the display surface of the microdisplay. The lens defines an angled fold, whereby light from a display generated at the display surface is reflected within the lens to thereby form a virtual image of the display in a virtual image plane that is angled non-perpendicularly relative to the display surface of the microdisplay.

28 Claims, 5 Drawing Sheets

(56) References Cited

U.S. PATENT DOCUMENTS

| | | | |
|---|---|---|---|
| 8,390,533 B2* | 3/2013 | Yamamoto | G02B 27/0172 345/7 |
| 8,416,153 B2* | 4/2013 | Yoshikawa | G02B 27/0172 345/7 |
| 8,493,287 B2* | 7/2013 | Yamamoto | G02B 27/0176 345/8 |
| 2016/0077345 A1* | 3/2016 | Bohan | G02C 7/16 349/13 |

* cited by examiner

COMPACT FOLDING LENS DISPLAY MODULE

RELATED APPLICATION

This application claims the benefit of U.S. Provisional Application No. 61/940,014, filed on Feb. 14, 2014. The entire teachings of the above application are incorporated herein by reference.

BACKGROUND OF THE INVENTION

Wearable headset devices can be used to produce an image for viewing. Microdisplays, such as liquid crystal displays (LCDs), can be used with an optical assembly to produce such a viewable image. Orientation of a microdisplay at 90° with respect to a device output optical axis is an easy way to optically engineer a display device, and such a device can be formed with a 90° right angle prism layout, for example. Such devices can be made with optical components such as lenses and mirrors that are aligned with respect to each other and then fixed in position. Alternatively, a single optical element may be used. Wearable headsets can be used for consumer, industrial, and military applications. However, microdisplay assemblies can significantly protrude past the frame of the headset, causing the headset to be bulky and unattractive, in addition to creating risk of the headset becoming entangled with other objects present in a wearer's environment and dislodged from the wearer. Further, alignment of separate optical components can be expensive, unreliable, and susceptible to misalignment and damage, and some headsets can have relatively high weight.

Therefore, a need exists for a lens and a method of using a lens that overcomes or minimizes the above-referenced problems.

SUMMARY OF THE INVENTION

The invention generally relates to a compact display module, such as can be used in a display module for wearable headset, and a method of using the compact display module, wherein a lens is configured to generate a virtual image of a microdisplay at an angle with respect to the microdisplay.

In one embodiment, the invention is a compact display module that can be used as part of a wearable headset that includes a microdisplay having a display surface, and a lens. The lens is positioned to receive light from the display surface of the microdisplay, the lens defining an angled fold, and light rays from a display generated at the display surface are reflected within the lens to thereby form a virtual image of the display in a virtual image plane that is non-perpendicularly angled relative to the display surface of the microdisplay.

In another embodiment, the invention is a method of generating a virtual image of a display surface, such as a virtual image that is created by a wearable headset, in a virtual imaging plane. The virtual imaging plane is angled relative to the display surface. The method includes focusing light rays from a display surface of a microdisplay at a first surface of a lens. The method also includes reflecting, at a second surface of the lens, the light rays from the display surface to thereby cause formation of a virtual image of the display surface in a virtual image plane that is angled non-perpendicularly relative to the display surface of the microdisplay.

This invention has several advantages. For example, the angle between the microdisplay and virtual image plane can be chosen to minimize protrusion of the display module from any frames of eyewear in which the compact display module is used, thus diminishing any risk of entanglement or damage to eyewear. Another advantage is that a single lens performs all necessary reflection and focusing functions. The lens thus does not require alignment of focusing and reflecting components with respect to each other and can be built and installed as a single piece of the display module. Consequently, the lens can also be less expensive to produce and less susceptible to any damage and misalignment. Yet another advantage is that lenses according to embodiments of the invention can be injection molded plastic lenses, which can be much lighter and more inexpensive that glass lenses.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating example embodiments.

DETAILED DESCRIPTION OF THE INVENTION

A description of example embodiments follows.

The teachings of all patents, published applications and references cited herein are incorporated by reference in their entirety.

The invention is generally directed to a compact display module and to a method of generating a virtual image of a display surface in a virtual imaging plane that is angled relative to the display surface. The compact display module is of a type that can be used in a display module for wearable headset. A microdisplay of the module has a display surface that is virtually imaged in a virtual image play that is angled with respect to the microdisplay. The virtual imaging is by means of a lens that performs a reflection and has an angled fold.

Figure 1A:
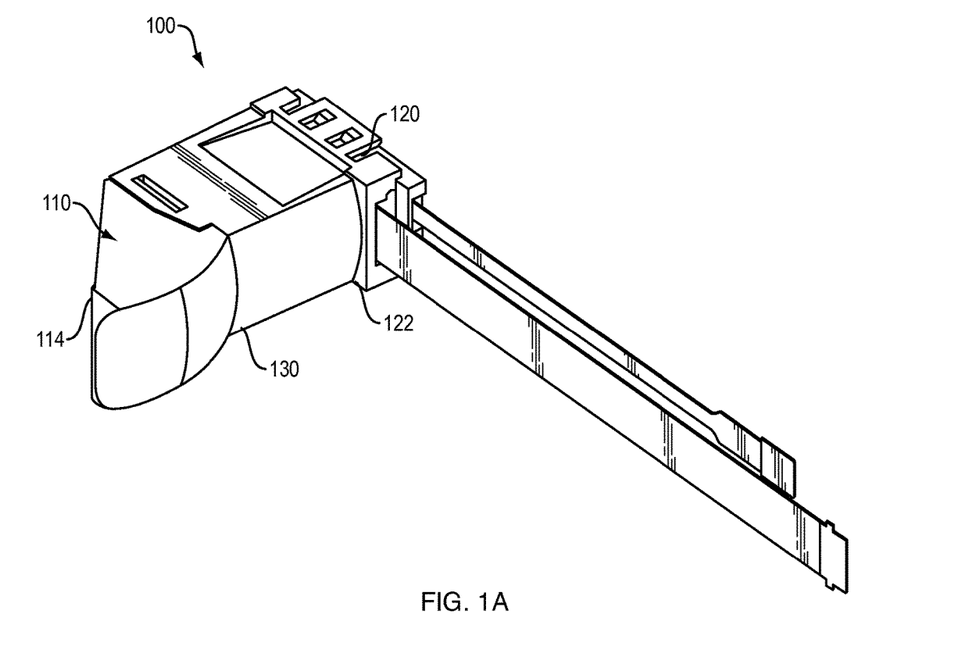
FIGS. 1A and 1B are perspective illustrations of a compact display module of the invention.
Figure 1B:
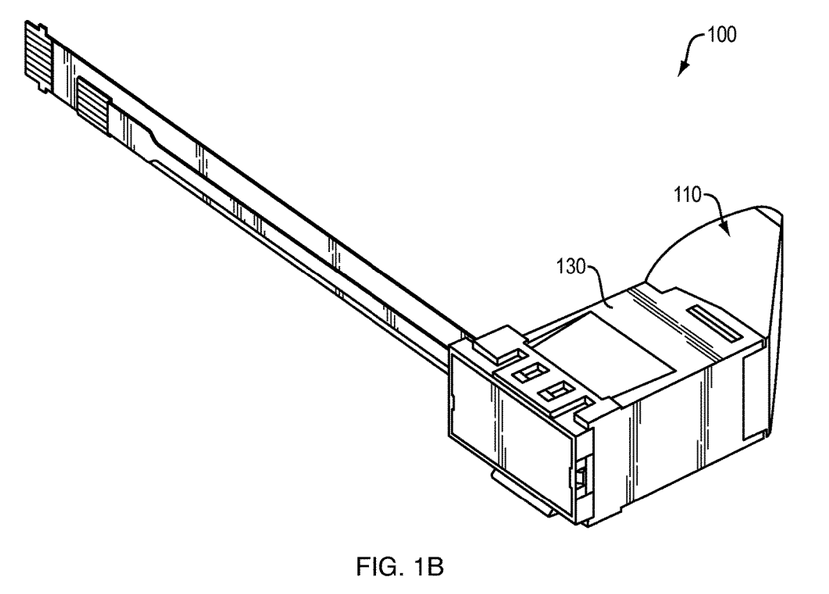

FIGS. 1A and 1B are perspective views of a compact display module 100. Compact display module 100 includes microdisplay 120, which has display surface 122. Compact display module 100 also includes lens 110, which defines an angled fold by utilizing reflective surface 114. With the angled fold, a display generated at display surface 122 is reflected within lens 110 to form a virtual image of the display in a virtual image plane that is angled non-perpendicularly relative to display surface 122 of microdisplay 120. The display, virtual image, and virtual image plane are described hereinafter in FIG. 1C.

As also shown in FIG. 1A, compact display module 100 includes housing 130, which is used to secure lens 110 to microdisplay 120. FIG. 1B shows a perspective view of compact display module 100 from another angle.

Figure 1C:
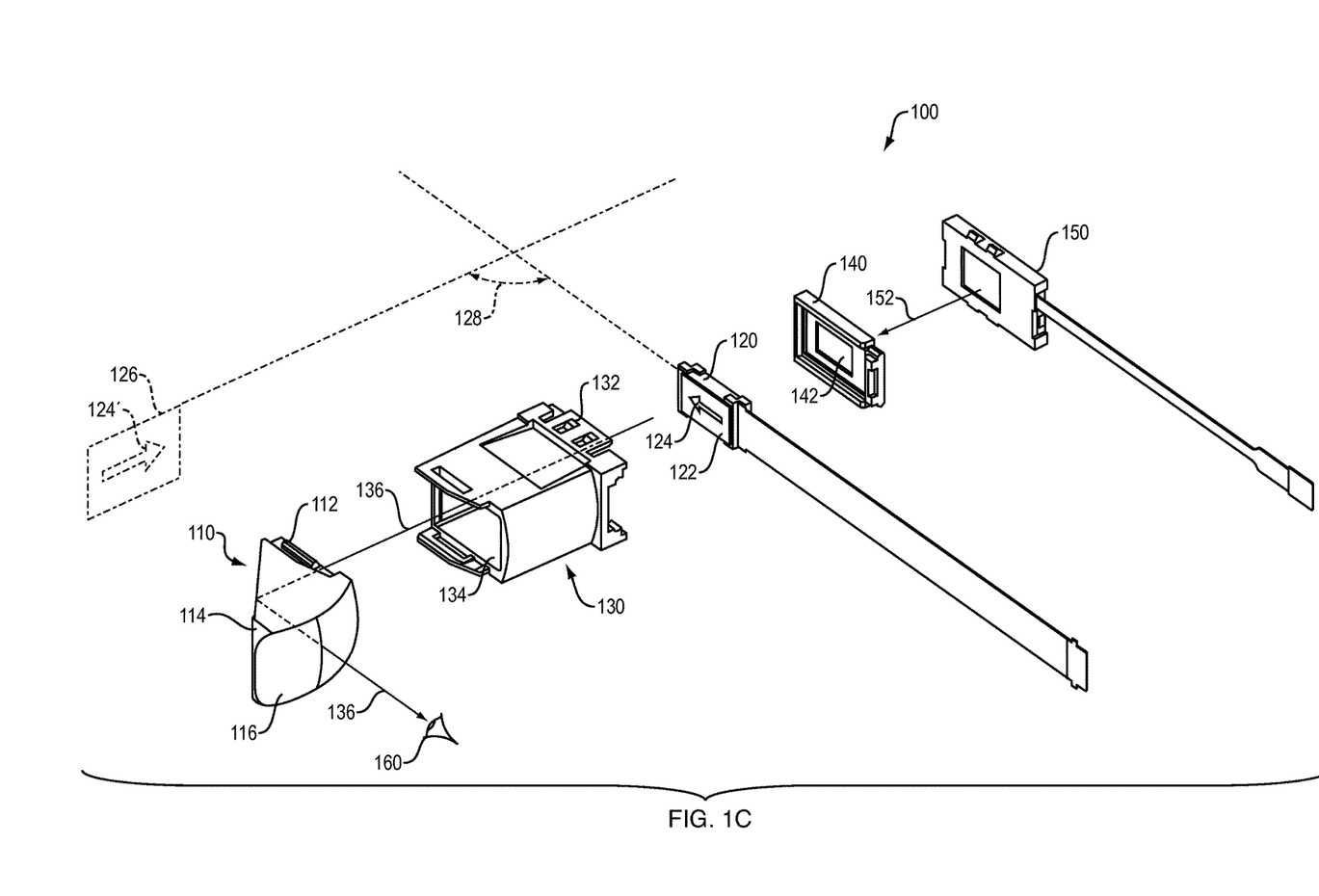
FIG. 1C is an exploded perspective view of the compact display module of FIG. 1A.

FIG. 1C is an exploded view of compact display module 100 shown in FIG. 1A. In FIG. 1C, housing 130 is shown in greater detail. In particular, housing 130 defines a first opening 132 and a second opening 134, and housing 130 also defines a light path 136 between first and second openings 132 and 134, respectively.

FIG. 1C also shows microdisplay 120 and lens 110 in greater detail. Microdisplay 120 has display surface 122 showing display 124. For illustration purposes, display 124 is an image of an arrow in FIG. 1C. Light is directed along path 136 from microdisplay 120, through housing 130, and though first lens surface 112 into lens 110. The light is reflected at second lens surface 114 and is directed through third lens surface 116 for viewing at eye 160. All three lens surfaces 112, 114, and 116 are adjacent to each other. Eye 160 sees virtual image 124' of display arrow 124. Virtual image 124' is oriented in a virtual image plane 126, which is at angle 128 with respect to display surface 122.

As also shown in FIG. 1C, compact display module 100 includes a housing cover 140 configured to secure microdisplay 120 to first opening 132 of housing 130. Housing cover 140 also defines window 142, through which light 152 can pass from backlight 150 to microdisplay 120. Microdisplay 120 is a liquid crystal display (LCD) and utilizes backlighting. However, in other embodiments, a microdisplay can be a light emitting diode (LED) display, a plasma display, or any other known type of display that is suitable for the application.

Figure 1D:
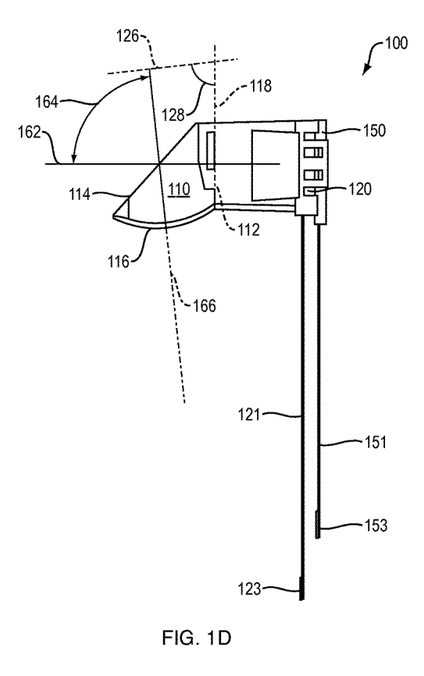
FIG. 1D is a top-view illustration of the compact display module shown in FIG. 1A.

FIG. 1D is a top-view illustration of compact display module 100 shown in FIG. 1A. As shown in FIG. 1D, first lens surface 112 has optical axis 162, and third lens surface 116 has optical axis 166. The optical axis 166 of the third lens surface 116 is an axis such that parallel light rays incident at the lens surface 116 and centered on the lens surface 116 with respect to the optical axis 166 come to one or more focal points also lying on the optical axis 166, in the case that the light rays are not redirected or refracted by another lens surface or optical component. Optical axis 166 of third lens surface 116 is at angle 164 with respect to optical axis 162 of first lens surface 112. Angle 164 is preferably in a range of between about 82° and about 86°, such that the optical axis 166 of third lens surface 116 is non-parallel with the display surface 122, and such that the virtual image plane 126 is non-perpendicularly angled relative to the display surface 122. Correspondingly, the second lens surface 114 is angled at a non-45° angle (different from or less than 45°) relative to the display surface 122. Even more preferably, angle 164 is about 84°, as it is in compact display module 100. Such an angular range for angle 164 provides for a more compact display module than a right angle would provide. With the compact display module, protrusion of the module past an eyeglass frame of a wearable headset is diminished, providing a more appealing look and also minimizing any risk of the wearable headset interfering with other objects. Further, since eyeglasses tend to have some curvature to follow the shape of the face, the folded optics with angle 164 at 84° better follow a curve of the eyeglasses.

Second lens surface 114 is an aluminum-coated surface of the lens that forms a mirror surface having high reflection. However, in other embodiments, other coatings such as silver, for example, may be used. In other embodiments, a separate mirror optic can be bonded or otherwise coupled to second lens surface 114 to provide the reflection. However, it is preferable to avoid separate optics, which can involve a separate bonding step, potentially increasing manufacturing costs and decreasing reliability. In yet other embodiments, second lens surface 114 is uncoated and relies on total internal reflection. Uncoated surfaces relying on total internal reflection can be advantageous because the presence of a reflective coating such as aluminum or silver in front of a person's face can be distracting and undesirable. Uncoated surfaces have been tested in exemplifications of the invention, and good optical reflection efficiency is maintained.

In compact display module 100, as shown in FIG. 1D, both first lens surface 112 and third lens surface 116 have nonzero focal power and focus light from microdisplay 120. First lens surface 112 is aspherical and is also configured to be a rotationally symmetric diffractive Fresnel surface, as will be understood in the art. The diffractive Fresnel surface functions primarily to reduce chromatic aberration but also focuses light entering lens 110. In other embodiments, however, first lens surface 112 is a different type of diffractive surface or is not diffractive. The second lens surface 114 is oriented in a major plane (the plane of the mirrored surface) that is angled with respect to a major plane 118 of the first lens surface 112. The major plane 118 of the lens surface 112 is a plane that is perpendicular to the optical axis 162 of the first lens surface 112.

Third lens surface 116 is also aspherical. Distribution of focal power over both first and third lens surfaces 112 and 116 is preferable because such distribution can reduce aberration. However, in other embodiments, only one of the first and third lens surfaces 112 and 116 has focal power, and the other surface is planar. It should be noted that in the embodiment illustrated in FIGS. 1A-1G, the first and third lens surfaces are non-planar and, thus, each has a nonzero focal power. This is in contrast to the second lens surface 114, which, in the embodiment illustrated in FIGS. 1A-1G, has a planar surface with zero focal power.

While some lenses can be integrated from multiple, separate optical components such as lenses and mirrors, lens 110 is comprised of a single injection-molded plastic lens having first, second, and third surfaces 112, 114, and 116, respectively. A major advantage of the injection molding approach is that a lens can be much less expensive and does not require assembly or alignment of separate optical components. Lens 110 is fabricated from Zeonex E48R™, which has the advantages of having low dispersion, low water absorption, good heat resistance, and of being easily moldable. However, in other embodiments, a lens can be fabricated from an optical glass or other optical-grade plastic material, for example.

In compact display module 100, first lens surface 112 and third lens surface 116 are coated with an anti-reflective coating. However, in other embodiments, anti-reflective coatings are not applied.

Lens 110 is fabricated with a single fixed focal distance of 3 meters, and the distance between the lens and the microdisplay surface is moved to set the focus. However, in other embodiments, a single fixed-focus lens can have a focal distance in a range from about 1 meter to about 3 meters, for example. Furthermore, in yet other embodiments, a variable focal length can be implemented. For example, in some embodiments, an additional lens is positioned outside of first lens surface 112 or third lens surface 116 and is configured to be movable along the optical path for variable focal power.

As also shown in FIG. 1D, compact display module 100 includes a flexible printed circuit (FPC) 121 connecting microdisplay 120 to a driver circuit (not shown) via microdisplay FPC connector 123. Similarly, backlight FPC 151 connects backlight 150 to a power source (not shown) via backlight FPC connector 153. In other embodiments, FPCs 121 and 151 are connected together at the module side to reduce connections to one connector serving both microdisplay 120 and backlight 150. In yet other embodiments, a driver circuit is included on the FTC or is integrated into the microdisplay.

Figure 1E:
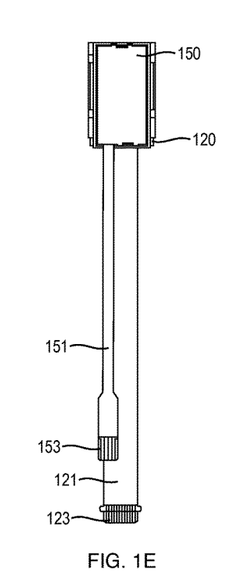
FIG. 1E is a side-view illustration of the microdisplay and backlight in the compact display module shown in FIG. 1D.

FIG. 1E is an end-on view of microdisplay 120 and backlight 150 in compact display module 100 as shown in FIG. 1D.

Figure 1F:
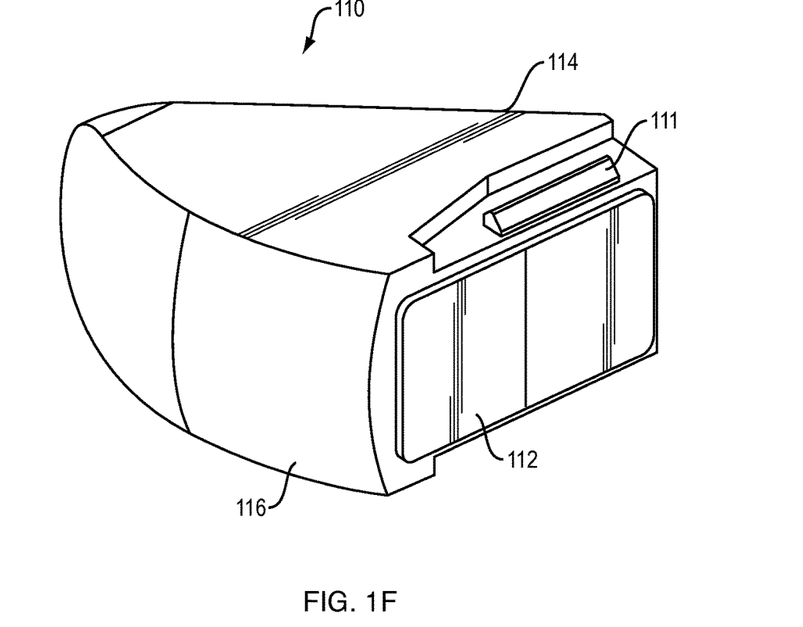
FIGS. 1F and 1G are detailed perspective illustrations of the lens in the compact display module shown in FIG. 1A.
Figure 1G:
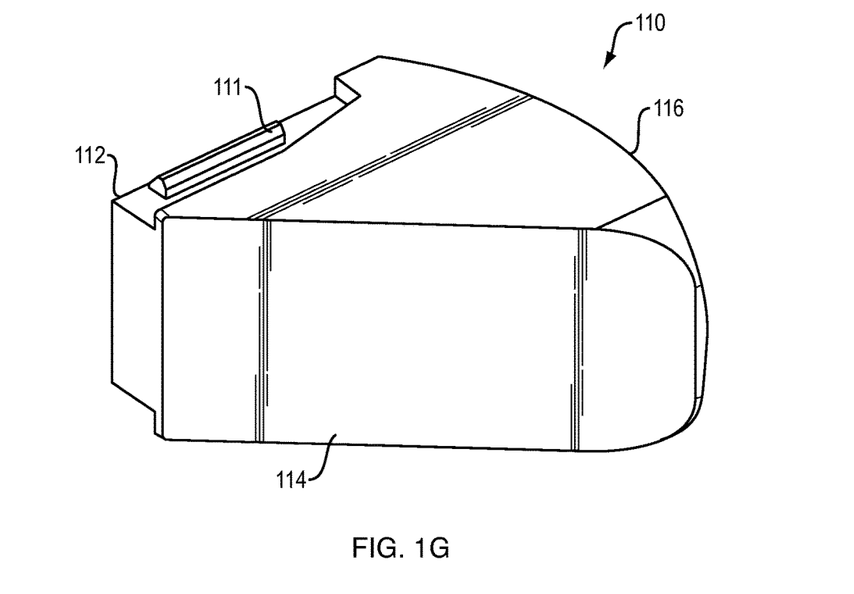

FIGS. 1F and 1E are perspective views of lens 110 from different angles. As shown in FIGS. 1F and 1G, injection-molded lens 110 includes clips 111 that are used to secure lens 110 to housing 130. Clips 111 firmly and easily secure lens 110 to housing 130, reducing manufacturing costs and assembly.

Figure 2:
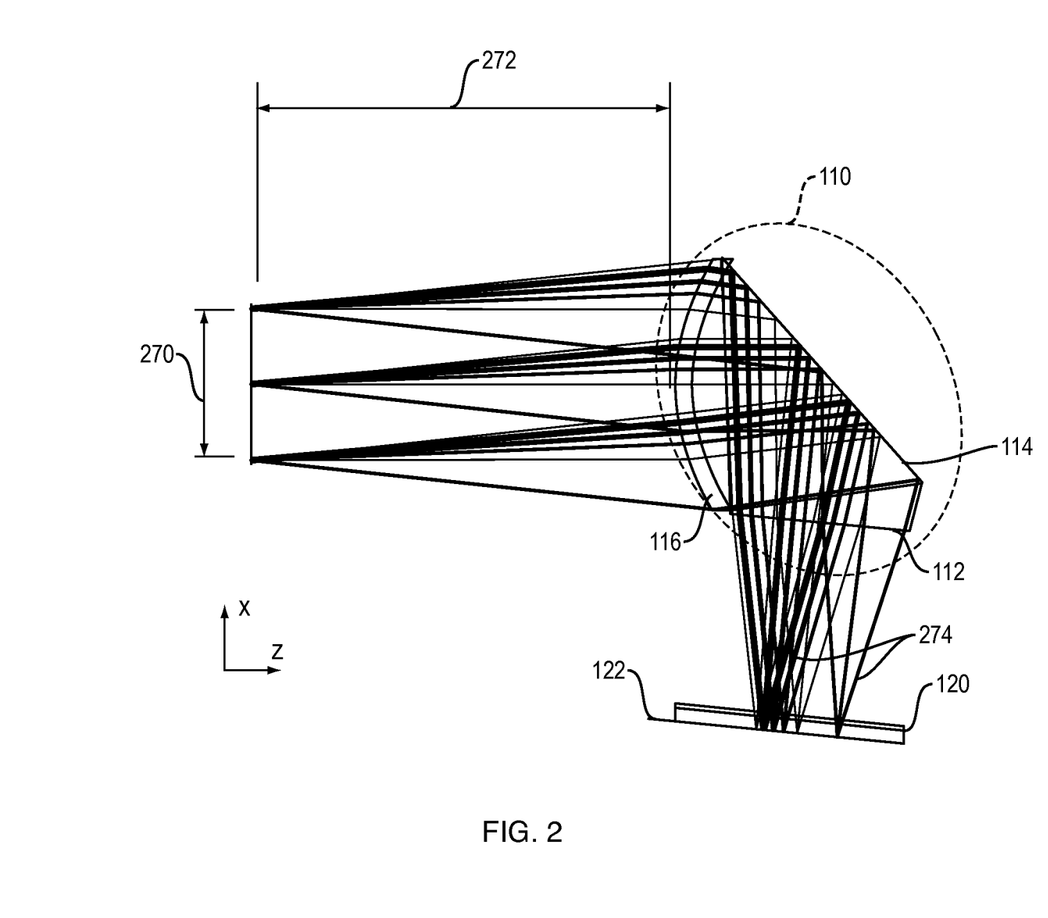
FIG. 2 is an optical system layout for the compact display module illustrated in FIGS. 1A-1G.

FIG. 2 is a schematic optical system layout illustration for the compact display module 100 illustrated in FIGS. 1A-1G. The lens 110, as described hereinabove, is comprised of the three lens surfaces 112, 114, and 116. As described hereinabove, the first lens surface 112 is aspheric and diffractive. The second lens surface 114 is an aluminum mirror. However, in other embodiments, the second lens surface 114 is a total internal reflection mirror surface. An exit lens (eye lens) is formed by the aspheric third lens surface 116 of the lens 110. Light rays 274 formed at the display surface 122 of the micro-display 120 exit the micro-display and enter the display lens 110 through the first lens surface 112. The rays are reflected from the second surface 114 and are refracted through the third lens surface 116 to converge. The converging rays traverse an eye relief distance 272 to enter an eye box 270, which represents the pupil aperture of the human eye through which the converging rays enter to form an image at the retina of the human eye 160 (illustrated in FIG. 1C). It should be noted that the angled fold in the light rays 274 provided by the lens surface 114, which can also be referred to as a folding mirror or folding lens, forms an angle that is less than 90° with respect to the display surface 122. This arrangement facilitates the virtual image plane 126 (illustrated in FIG. 1D) being non-perpendicular relative to the display surface 122.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A compact display module, comprising:
   a) a microdisplay having a display surface;
   b) a lens positioned to receive light from the display surface of the microdisplay, the lens defining an angled fold, whereby light rays from a display generated at the display surface are reflected within the lens to thereby form a virtual image of the display in a virtual image plane that is non-perpendicularly angled relative to the display surface of the microdisplay;
   c) a housing defining a first opening and a second opening, wherein the display surface of the microdisplay is at the first opening and the lens is at the second opening; and
   d) a housing cover at the first opening, the housing cover securing the microdisplay to the first opening.

2. The compact display module of claim 1, further including a backlight fixed to the housing cover.

3. The compact display module of claim 1, wherein the lens defines a first lens surface at the second opening of the housing cover, a second lens surface in a major plane that is at an angle with respect to a major plane substantially parallel to the first lens surface, the second lens surface being reflective, and a third lens surface oriented relative to the reflective surface to thereby receive light from the display reflected by the reflective surface.

4. The compact display module of claim 3, wherein an optical axis of the third lens surface is at an angle in a range of between about 82° and about 86° with respect to an optical axis of the first lens surface.

5. The compact display module of claim 3, wherein the reflective surface is coated to form a mirror surface.

6. The compact display module of claim 5, wherein the reflective surface is coated with at least one substance of the group consisting essentially of aluminum and silver.

7. The compact display module of claim 3, wherein at least one of the first and third lens surfaces has a focal power of essentially zero.

8. The compact display module of claim 3, wherein the reflective surface is uncoated.

9. The compact display module of claim 3, wherein at least one of the first and third lens surfaces is planar.

10. The compact display module of claim 3, wherein at least one of the first and third lens surfaces has a non-zero focal power.

11. The compact display module of claim 3, wherein at least one of the first and third lens surfaces is aspherical and has a rotationally symmetric diffractive property.

12. The compact display module of claim 3, wherein at least one of the first and third lens surfaces is coated with an antireflective coating.

13. The compact display module of claim 3, wherein the lens is fabricated of at least one material selected from the group consisting of glass and optical-grade plastics.

14. The compact display module of claim 3, wherein the lens has a focal length in a range of between about 1 and 3 meters.

15. The compact display module of claim 3, wherein a focal length of the lens is fixed.

16. The compact display module of claim 3, wherein a focal length of the lens is variable.

17. The compact display module of claim 1, wherein the microdisplay is a Liquid Crystal Display (LCD).

18. The compact display module of claim 1, further including a flexible printed circuit electrically connected to the microdisplay.

19. The compact display module of claim 1, wherein the lens defines a first lens surface, a second lens surface in a major plane that is at an angle with respect to a major plane substantially parallel to the first lens surface, the second lens surface being reflective, and a third lens surface oriented relative to the reflective surface to thereby receive light from the display reflected by the reflective surface.

20. The compact display module of claim 19, wherein an optical axis of the third lens surface is at an angle in a range of between about 82° and about 86° with respect to an optical axis of the first lens surface.

21. The compact display module of claim 19, wherein the second lens surface forms an angle of less than 45° relative to the display surface of the microdisplay.

22. A method of generating a virtual image of a display surface in a virtual imaging plane that is angled relative to the display surface, comprising the steps of:
   a) directing light rays from a display surface of a microdisplay through a first surface of a lens;
   b) reflecting, at a second surface of the lens, the light rays from the display surface to thereby cause formation of a virtual image of the display surface in a virtual image plane that is non-perpendicularly angled relative to the display surface of the microdisplay; and
   c) directing the light through a third surface of the lens, wherein an optical axis of the third surface of the lens is at an angle in a range of between about 82° and about 86° with respect to an optical axis of the first surface of the lens.

23. The method of claim 22, wherein the third surface of the lens further focuses the light.

24. The method of claim 22, further comprising the step of controlling chromatic aberration using a rotationally symmetric diffractive property of at least one of the first and third surfaces.

25. The method of claim 22, wherein the reflecting step includes a total internal reflection.

26. The method of claim 22, further including the step of generating the light from the display surface at a backlight for the microdisplay.

27. A compact display module, comprising:
   a) a microdisplay having a display surface; and
   b) a lens positioned to receive light from the display surface of the microdisplay, the lens defining an angled fold, whereby light rays from a display generated at the display surface are reflected within the lens to thereby form a virtual image of the display in a virtual image plane that is non-perpendicularly angled relative to the display surface of the microdisplay,
   wherein the lens defines a first lens surface, a second lens surface in a major plane that is at an angle with respect to a major plane substantially parallel to the first lens surface, the second lens surface being reflective, and a third lens surface oriented relative to the reflective surface to thereby receive light from the display reflected by the reflective surface, and
   wherein an optical axis of the third lens surface is at an angle in a range of between about 82° and about 86° with respect to an optical axis of the first lens surface.

28. A compact display module, comprising:
   a) a microdisplay having a display surface;
   b) a lens positioned to receive light from the display surface of the microdisplay, the lens defining an angled fold, whereby light rays from a display generated at the display surface are reflected within the lens to thereby form a virtual image of the display in a virtual image plane that is non-perpendicularly angled relative to the display surface of the microdisplay;
   c) a housing defining a first opening and a second opening, the housing defining a light path between the first and second openings, wherein the display surface of the microdisplay is at the first opening and the lens is at the second opening; and
   d) a housing cover at the first opening, the housing cover securing the microdisplay to the first opening.

* * * * *